(12) United States Patent
Klein

(10) Patent No.: US 6,648,493 B2
(45) Date of Patent: Nov. 18, 2003

(54) EXTERNAL ACTUATING MECHANISM FOR VEHICLE LOCKS

(75) Inventor: Helmut Klein, Velbert (DE)

(73) Assignee: Huf Hülsbeck & Fürst GmbH & Co. KG, Velbert (DE)

(*) Notice: Subject to any disclaimer, the term of this patent is extended or adjusted under 35 U.S.C. 154(b) by 5 days.

(21) Appl. No.: 10/133,827

(22) Filed: Apr. 26, 2002

(65) Prior Publication Data
US 2002/0157436 A1 Oct. 31, 2002

(30) Foreign Application Priority Data
Apr. 28, 2001 (DE) .......................... 101 21 046

(51) Int. Cl.[7] ................................ B60Q 1/00
(52) U.S. Cl. ................. 362/501; 362/100; 362/802
(58) Field of Search ....................... 362/100, 501, 362/276, 802; 16/412

(56) References Cited

U.S. PATENT DOCUMENTS

| | | | |
|---|---|---|---|
| 4,041,301 A | | 8/1977 | Pelchat |
| 5,729,057 A | * | 3/1998 | Frenzel et al. ............ 362/100 |
| 6,239,693 B1 | * | 5/2001 | Benard et al. ............ 362/501 |

FOREIGN PATENT DOCUMENTS

| | | |
|---|---|---|
| DE | 851604 | 1/1952 |
| DE | 3136889 | 9/1985 |
| DE | 4025855 | 2/1992 |
| DE | 197 45 149 A1 | 4/1999 |
| DE | 196 17 038 C2 | 11/2000 |
| EP | 9741322 | 11/1997 |

* cited by examiner

Primary Examiner—Stephen Husar
(74) Attorney, Agent, or Firm—Friedrich Kueffner

(57) ABSTRACT

An external actuating mechanism for vehicle doors in doors, hoods, lids or the like, wherein the mechanism includes a handle for opening the door, a locking unit for activating and deactivating the lock, and at least one electrical light source for temporarily illuminating a field of operation of the mechanism. An electrically operated sensor is mounted in the interior of the handle and is connected to the current supply of the vehicle. When an authorized person who is in the possession of a data carrier approaches, the sensor releases a data communication with the data carrier and deactivates the lock after a successful data comparison. A bore in the handle serves as housing for receiving the light source. The light source is connected to the electrical supply lines of the sensor arranged in the interior of the handle. The electronic system of the sensor serves for switching on the light source.

3 Claims, 1 Drawing Sheet

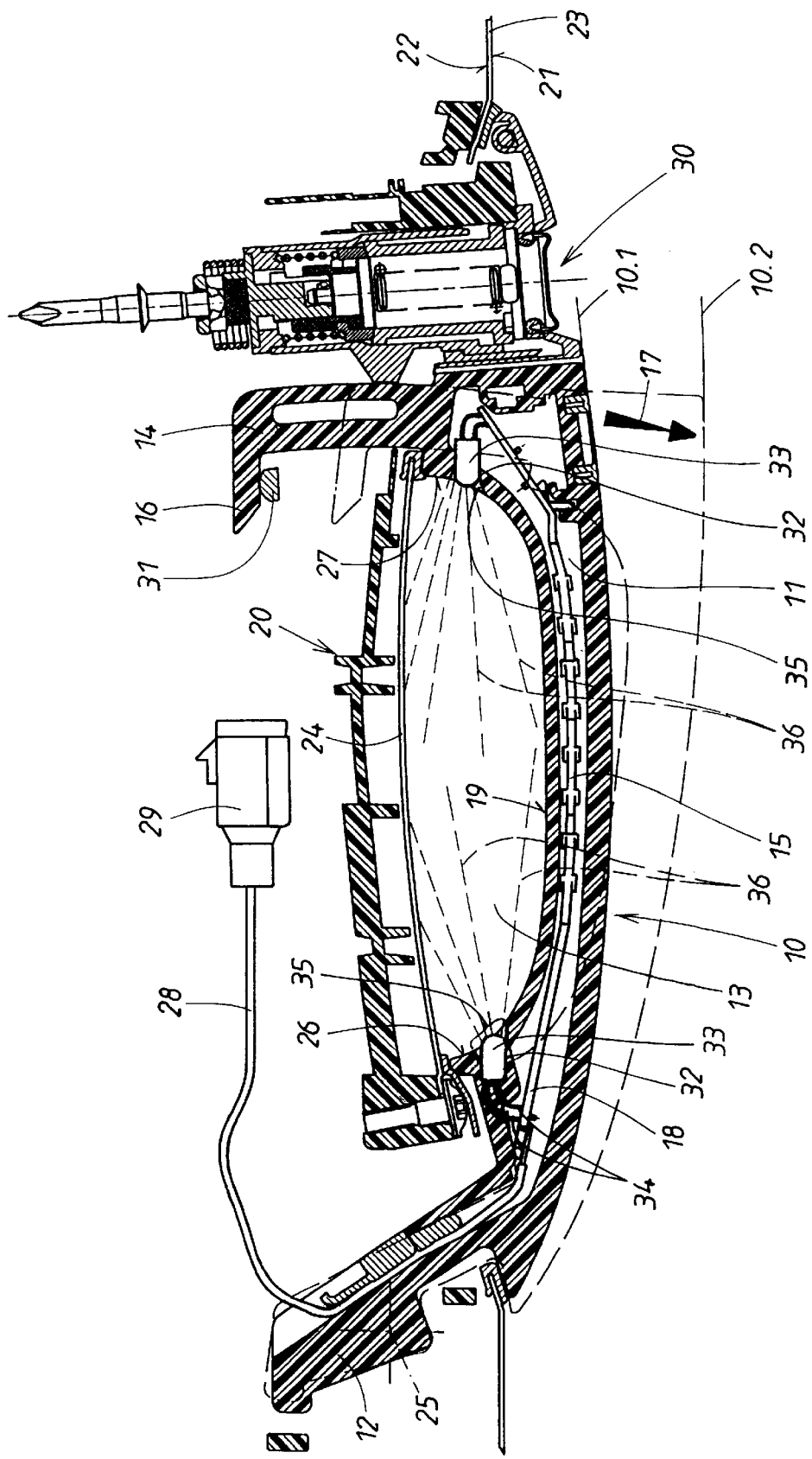

EXTERNAL ACTUATING MECHANISM FOR VEHICLE LOCKS

BACKGROUND OF THE INVENTION

1. Field of the Invention

The present invention relates to an external actuating mechanism for vehicle locks in doors, lids or hoods, or the like, with a handle for opening the door, a locking cylinder, if applicable, for activating and deactivating the lock, and at least one electrical light source for temporarily illuminating the field of operation of the external actuating mechanism.

2. Description of the Related Art

The handle of an external actuating mechanism for vehicles is stirrup-shaped and can be manually grasped and operated. The lock then releases the door when the lock is in a deactivated position; the door is opened. However, the lock can also be transferred into an activated position which is effected through a locking cylinder or the like. An electrically operated light source is used for illuminating the field of operation of the external actuating mechanism.

In a known external actuating mechanism of this type disclosed in DE 31 36 889 C2, a lamp is arranged in a lamp housing which is mounted next to a locking cylinder. The light is conducted from there into a subsequently arranged prism which annularly surrounds the end face of the locking cylinder. This known illuminating device was economically not successful because it was necessary to provide separate electrical lines in the vehicle which extend up to the area of the locking cylinder and it was necessary to provide room for fastening means for arranging the lamp housing. This renders the device complicated and expensive.

In an external actuating mechanism without illumination, it is known from WO 97/41322 to integrate a capacitive sensor in the stirrup of the handle, wherein the sensor builds up an electrical field in the area of the handle. An authorized person is in the possession of a data carrier which is coded so as to coincide with the data contained in the storage unit of the vehicle. When an authorized person approaches the handle, the electrical field is changed and a data communication is released. After the data comparison has been successful, the lock is deactivated and the door can be opened by means of the handle.

SUMMARY OF THE INVENTION

It is the primary object of the present invention to develop an inexpensive external actuating mechanism of the type described above which saves space and ensures a good illumination at the correct time.

In accordance with the present invention, an electrically operated sensor is mounted in the interior of the handle and is connected to the current supply system of the vehicle. When an authorized person who is in the possession of a data carrier approaches, the sensor releases a data communication with the data carrier and, after a successful data comparison, deactivates the lock. A bore in the handle serves as the housing for receiving the light source. The light source is connected to the electrical supply lines of the sensor which are arranged in the interior of the handle. The electronic system of the sensor is used for switching on the light source.

Accordingly, the present invention not only utilizes the handle as a lamp housing for receiving the light source, but also uses the electrical supply lines which are already provided in the interior of the handle as the electrical connection for the light source. The light source is integrated into the handle. This saves space for the light source and for additional lamp lines. This is because a sensor is mounted in the interior of the handle which is already connected to the current supply of the vehicle. When an authorized person approaches, the sensor responds and deactivates the lock, wherein an appropriate electronic system is provided in the stirrup area. Finally, the invention utilizes also this electronic system of the sensor for switching on the light source. When the light source is switched on, that space of the handle is illuminated which is intended to be engaged by the human hand.

Accordingly, the handle serves as a support for placing the light source, and the electrical system and the control system provided for the sensor are simultaneously used for operating the light source and for switching the light source on and off. As a result, the measures which have to be taken in accordance with the present invention are reduced to a minimum, namely, the arrangement of the light source in the stirrup and the electrical connections for the light source.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a sectional view of an embodiment of the external actuating mechanism according to the present invention.

DETAILED DESCRIPTION OF THE INVENTION

The external actuating mechanism includes a handle 10 which is accessible at the outer side 21 of a door lining 23, a support 20 fastened to the inner side 22 of the door lining 23, and a locking cylinder-30 integrated next to the handle 10 in the support 20. The locking cylinder 30 is only provided as an emergency measure when the electronic system provided in the motor vehicle fails; the locking cylinder 30 is used for transferring a door lock, not shown, from an activated position in which the handle 10 cannot be operated, into a deactivated position in which the lock releases the door through the handle 10 and the door can be opened. An electronic system which can be actuated by a sensor 15 is normally used for activating and deactivating the lock.

In the illustrated embodiment, the handle 10 is composed of a stirrup-shaped pull grip. The sensor 15 which acts capacitively is provided in the interior 11 of the grip. A first electrode is integrated in the handle 10 and a second electrode is formed by the areas 24 of the door, for example, a grip indentation provided at this location and mounted in the support 20. An electrical field is generated between these two electrodes, wherein the capacity of the electrical field changes when the human hand reaches into this area. This change is recognized by the sensor 15 and the sensor 15 effects through a control unit the above-described reversal of the lock.

The handle 10 is hinged with its end 12 to the support 20, wherein the hinge axis is designated with reference numeral 25 in the drawing. As a result of being biased by a spring, not shown, the handle 10 is held in its position of rest which is shown in solid lines and is indicated by the auxiliary line 10.1. For opening the door, the human hand engages in the interior space 13 of the stirrup, and the sensor 15 causes the above-mentioned reversal of the lock. The hand then surrounds the stirrup and pulls the stirrup into the actuating position shown in broken lines and indicated by auxiliary line 10.2. This results in a pivoting movement of the handle 10 around the hinge axis 25. Provided at the second end 14 of the handle 10 is a shaft which engages a member 31 of the lock with a drive member 16. When the handle 10 is actuated as indicated by arrow 17, the lock member 31 is moved and causes the aforementioned opening of the door.

The supply and control lines indicated by reference numeral 18 for the sensor 15 extend in the interior of the handle. The lines 18 are connected to an electrical cable 28 which extends out of the end 12 of the handle 10 and ends at a plug-in connection 29. After the installation of the external actuating mechanism, the plug-in connection 29 is contacted with complementary connection components in the door which are electrically connected to the current supply and other electronic system of the vehicle.

Two bores 32 serving to receive two light sources 33 are provided at the two ends 26 and 27 of the curved portion 19 of the stirrup. The light sources 33 are small lamps; for this reason, the bores 32 act as lamp housings. The lamp connections 34 are connected to the electrical lines 18 of the sensor 15 and are supplied with electrical voltage through these lines and are switched on and off through the electronic system of the sensor. Consequently, the lamps 33 utilize the electrical systems and controls which are already provided for the sensor 15.

The light discharge openings 35 for the lamps 33 are directed toward the interior 13 of the stirrup and are located approximately opposite each other. When the lamps 33 are switched on by the electronic system of the sensor, the lamps 33 illuminate the entire interior space 13 of the stirrup, as indicated by broken lines 36 in the drawing. The space between the handle 10 and the door indentation 25 for the handle is now well illuminated. This illumination 36 is effected by the authorized person who approaches the vehicle and is in the possession of a data carrier whose coding coincides with that of the control system of the lock. The authorized person can now see also in the dark at which location of the vehicle his or her hand has to be placed for reliably grasping the handle 10 and actuating the handle 10 as indicated by reference numeral 17.

While specific embodiments of the invention have been shown and described in detail to illustrate the inventive principles, it will be understood that the invention may be embodied otherwise without departing from such principles.

I claim:

1. An external actuating mechanism for vehicle locks, the mechanism comprising a handle, a locking means for activating and deactivating the lock, and at least one electrical light source for temporarily illuminating a field of operation of the external actuating mechanism, further comprising an electrically operated sensor mounted in an interior of the handle and adapted to be connected to a current supply of the vehicle, wherein the sensor is configured, when an authorized person with a data carrier approaches, to release a data communication with the data carrier and to deactivate the lock after a successful data comparison, wherein the handle has a bore serving as a housing for receiving the light source, wherein the light source is connected to electrical supply lines of the sensor arranged in the interior of the handle, and wherein the sensor has an electronic system and the electronic system is configured to switch on the light source.

2. The external actuating mechanism according to claim 1, wherein the handle is comprised of a stirrup-shaped pull grip, wherein the pull grip has two bores with light sources mounted in the bores, wherein the bores are arranged at both ends of the stirrup-shaped pull grip, and wherein the bores have light discharge openings facing an interior of the stirrup-shaped pull grip, whereby the interior space is illuminated when the light sources are switched on.

3. The external actuating mechanism according to claim 1, wherein the sensor is a capacitively acting sensor.

* * * * *